United States Patent [19]
Lenz

[11] Patent Number: 6,042,722
[45] Date of Patent: Mar. 28, 2000

[54] APPARATUS FOR DE-WATERING AND PURIFYING FUEL OILS AND OTHER LIQUIDS

[76] Inventor: Ronald L. Lenz, 1198 SE. Menores Ave., Port St. Lucie, Fla. 34952-5359

[21] Appl. No.: 09/229,765

[22] Filed: Jan. 14, 1999

[51] Int. Cl.[7] .................................................. C02F 1/40
[52] U.S. Cl. .......................... 210/95; 210/167; 210/172; 210/305; 210/313; 210/519; 210/521; 210/533; 210/540; 210/DIG. 5
[58] Field of Search ............................... 210/94, 95, 167, 210/171, 172, 136, 258, 259, 299, 305, 312, 313, 519, 521, 532.1, 533, 538, 54 D, DIG. 5

[56] References Cited

U.S. PATENT DOCUMENTS

| | | | |
|---|---|---|---|
| 695,952 | 3/1902 | Smith | 210/519 |
| 1,193,970 | 8/1916 | Bacher | 210/313 |
| 1,372,828 | 3/1921 | Penn | 210/533 |
| 1,579,485 | 4/1926 | Piccinlli | 210/313 |
| 1,613,507 | 1/1927 | Feely | 210/172 |
| 2,624,463 | 9/1953 | Freese | 210/172 |
| 2,625,268 | 1/1953 | Hatfield, Jr. | 210/172 |
| 2,626,054 | 1/1953 | Henigman | 210/533 |
| 2,793,186 | 5/1957 | Dunell et al. | 210/521 |
| 3,322,280 | 5/1967 | Taylor | 210/313 |
| 3,465,883 | 9/1969 | Jumper | 210/313 |
| 3,797,203 | 3/1974 | Murdock, Sr. | 210/521 |
| 3,931,011 | 1/1976 | Richards et al. | 210/313 |
| 4,921,609 | 5/1990 | Fromson | 210/521 |
| 5,073,266 | 12/1991 | Bull, IV | 210/519 |
| 5,840,198 | 11/1998 | Clarke | 210/521 |

*Primary Examiner*—Christopher Upton
*Attorney, Agent, or Firm*—Ronald E. Greigg; Edwin E. Greigg

[57] ABSTRACT

An apparatus for separating water contaminants from a fuel which has a specific gravity which is lower than that of water. Contaminated fuel is drawn from a bottom of a tank and passed into a separator. The water stays at the bottom of the separator and is drained off. The fuel is forced upwardly from which any droplets of water flow along collector plates and fall to the bottom of the separator. The fuel is passed through a filter which removes any particles of matter then the fuel is directed back to the tanks. The process can be repeated for as many times as necessary to cleanse the fuel of water and contaminates.

10 Claims, 6 Drawing Sheets

APPARATUS FOR DE-WATERING AND PURIFYING FUEL OILS AND OTHER LIQUIDS

FIELD OF INVENTION

This invention relates to the removal by coalescence of water and other impurities from diesel fuel, jet fuel, gasoline, kerosene, heating oil, motor oil and other liquids with a specific gravity less than one (1).

BACKGROUND OF THE INVENTION

Stored diesel fuel or other hydrocarbon distillates such as jet fuel, kerosene, gasoline, and heating oil will begin to degrade in storage because of microbial contamination and fungi which grow in the fuel water interface.

It is essential that the fuel used in fuel injected internal combustion engines and jet engines be free of water, algae, and other contaminates. When fuel is stored in bulk or in a vehicle, boat, and aircraft fuel tanks, water droplets condensed from the atmosphere will form inside the fuel storage tanks and their ventilation pipes and will promote the growth of microbial debris. The accumulation of this condensation and microbial growth will eventually be ingested by the engine fuel pick-up tubes which are generally located somewhat above the bottom of the tank, and carried along with the fuel to the engine fuel filtration system. In the case of ships at sea and aircraft as they encounter turbulent and rough conditions, the accumulated condensation and microbes at the fuel water interface, which is located between the bottom of the tank and the fuel pick-up tube move about the storage tank so as to be easily ingested in quantities large enough to totally fill or saturate the engines filtration system causing the engine to stop.

In an attempt to eliminate this problem engine filter manufactures have fitted the filter cartridges with drains and sight glasses and occasionally electronic sensors to indicate the presence of water within the fuel filter. However, this remedy will not eliminate the growth of microbial debris within the fuel tank. A further attempt to solve the microbial contamination problem is the use of costly and hazardous biocides to attempt to kill the micro-organisms within the tank. This remedy however tends to clog filters with the massive influx of dead organisms. Additionally, these filtration units have inadequate capacity to remove the volume of water and contaminates that are ingested during turbulence and rough conditions. And further, these units only remove a small percentage of free water and very little emulsified water due to the relatively high velocity movement of fuel within the system and only operate while the engines are running.

This invention, for the first time makes it possible to coalesce and remove water, and other impurities, independent of the engine fuel filtration system by drawing fluid directly from the lowest point of the tank, and return it to the tank as a continuous closed loop procedure, thus eliminating microbial contamination within the tank, as well as eliminating clogged filters.

ADVANTAGES AND OBJECTS OF THE INVENTION

This system for removing water from a fuel tank is separate from the fuel system which supplies fuel to an engine.

It is therefore an object of the invention to remove water and microbial contamination from a fuel tank independent of the fuel system which operates the engine.

Another object is to remove water and other contaminates from a fuel tank by drawing the contaminates from the tank and then returning the non-contaminated fuel back to the tank.

Still another object is to remove contaminates from a fuel tank without the necessity of operating the engine.

Yet another object of the invention is to withdraw water and other contaminates directly from a bottom of the fuel tank and then returning the non-contaminated fuel back to the tank as a continuous closed cycle.

While another object is to provide a system for removing contaminates from a fuel tank independent of the fuel system for operating the engine.

Other objects and advantages of the invention will become obvious to those skilled in the art upon a review of the following description of the drawings.

DETAILED DESCRIPTION OF THE DRAWINGS

Figure 1:
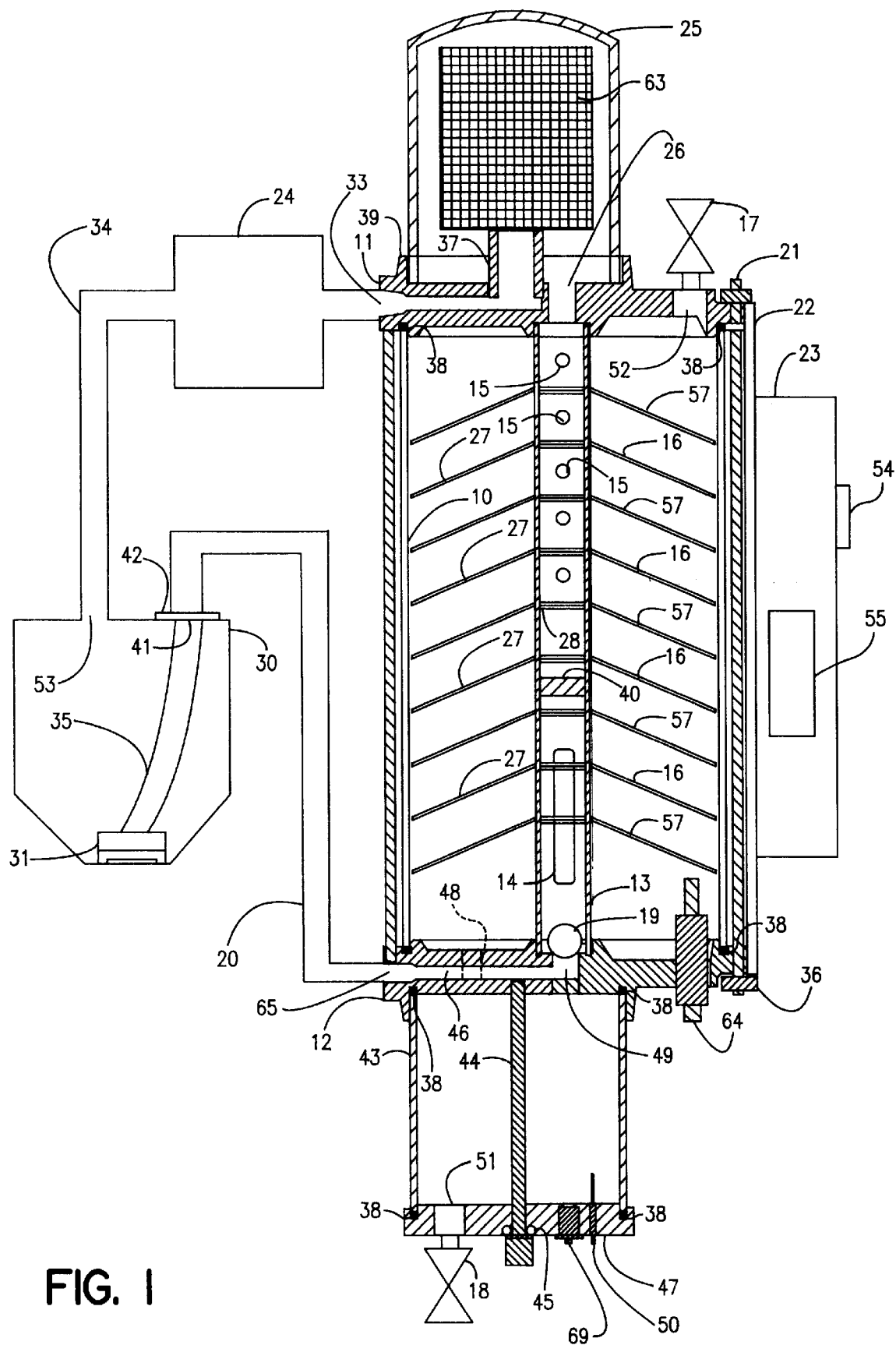
FIG. 1 illustrates a schematic front view, partially in section, of an apparatus and system according to the invention.
Figure 2:
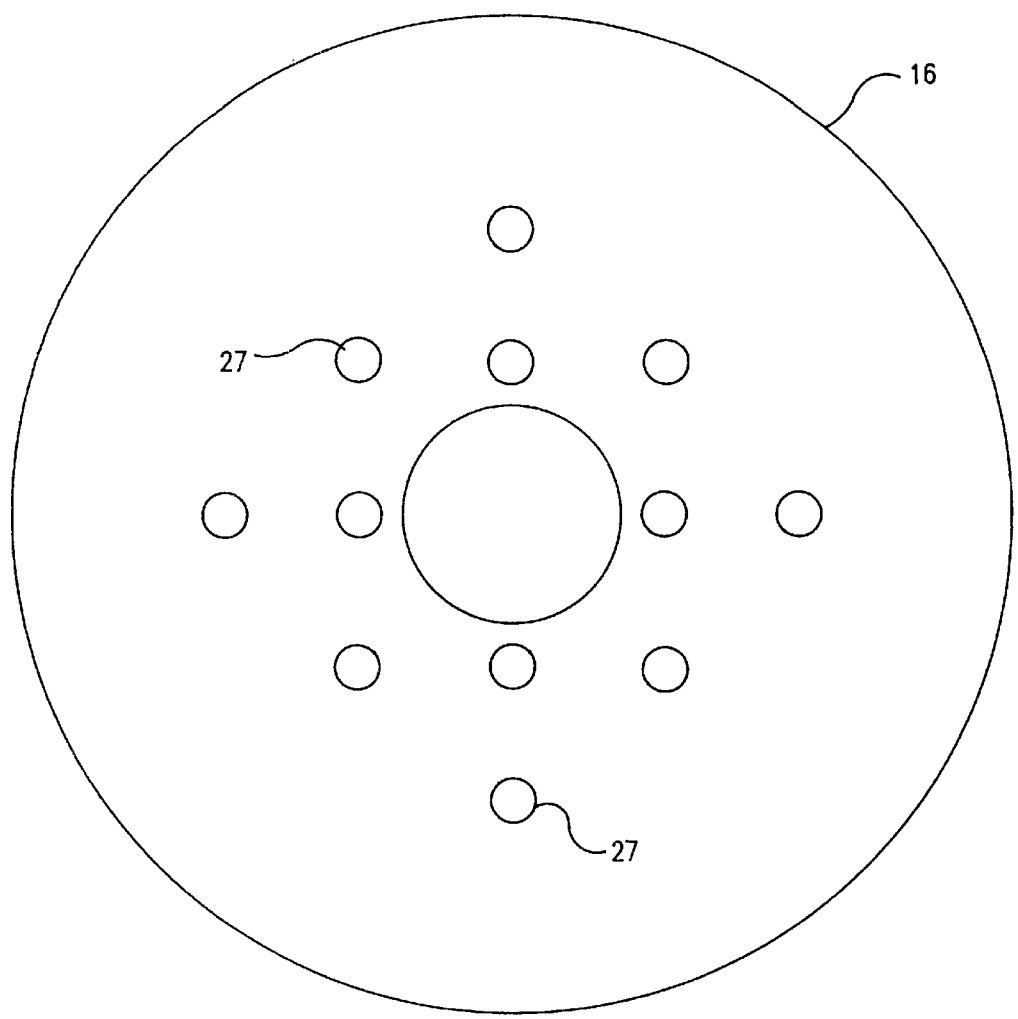
FIG. 2 is a top view of one of a plurality of coalescer plates used in the contaminate removing system.
Figure 3:
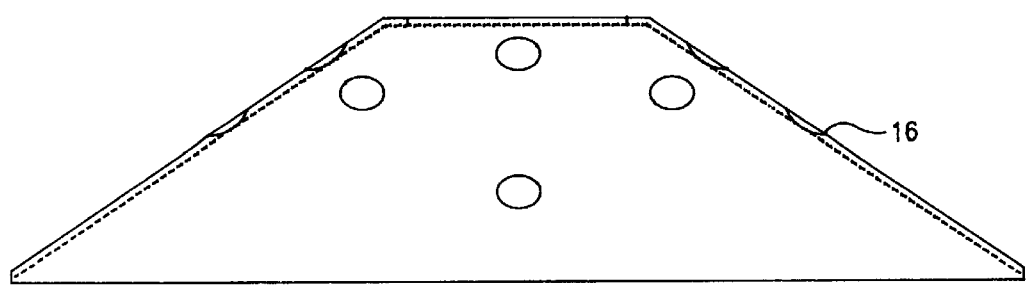
FIG. 3 illustrates a side view of the coalescer plate shown in FIG. 2.
Figure 4:
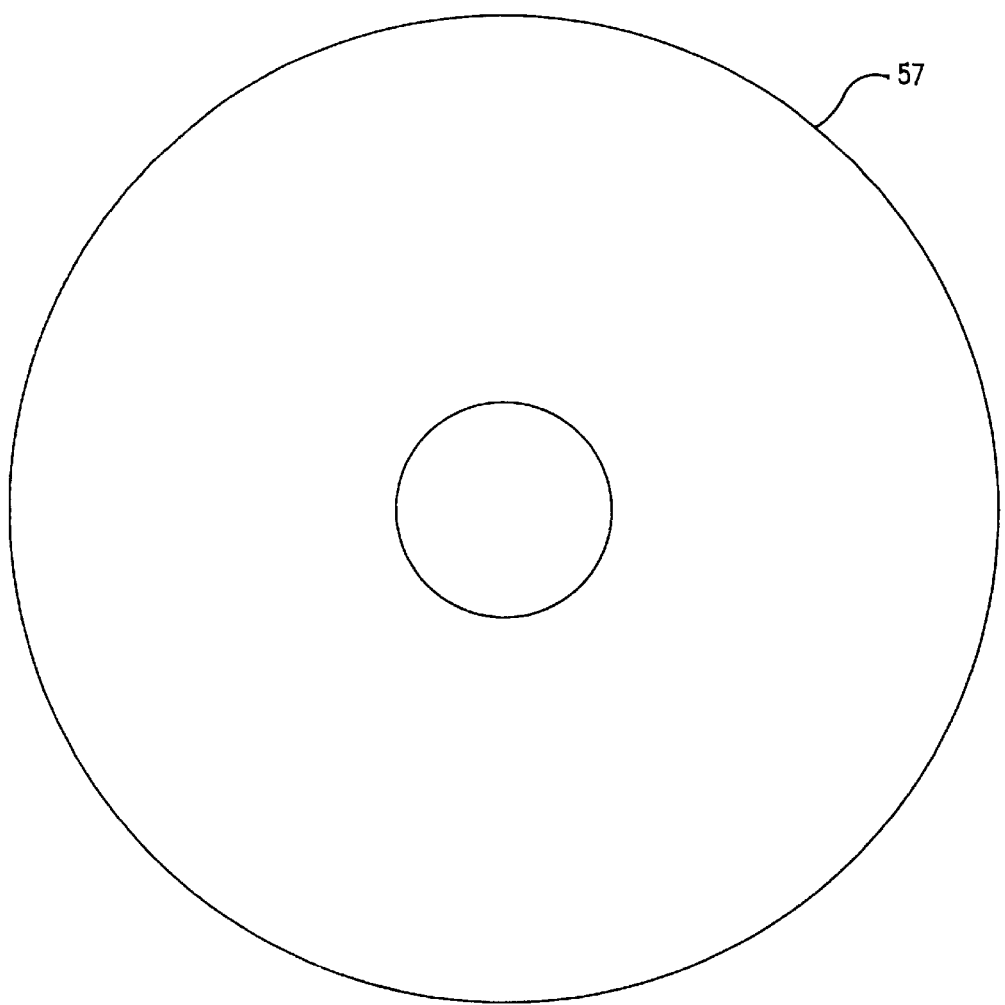
FIG. 4 illustrates a top view of one of a plurality of another coalescer plate.
Figure 5:
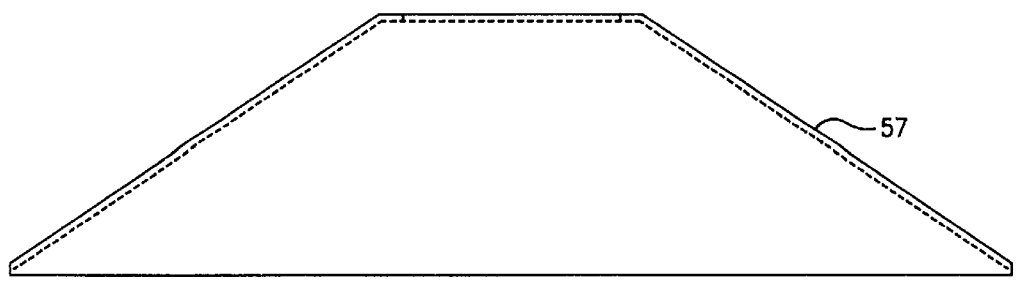
FIG. 5 illustrates a side view of coalescer plate shown in FIG. 4.
Figure 6:
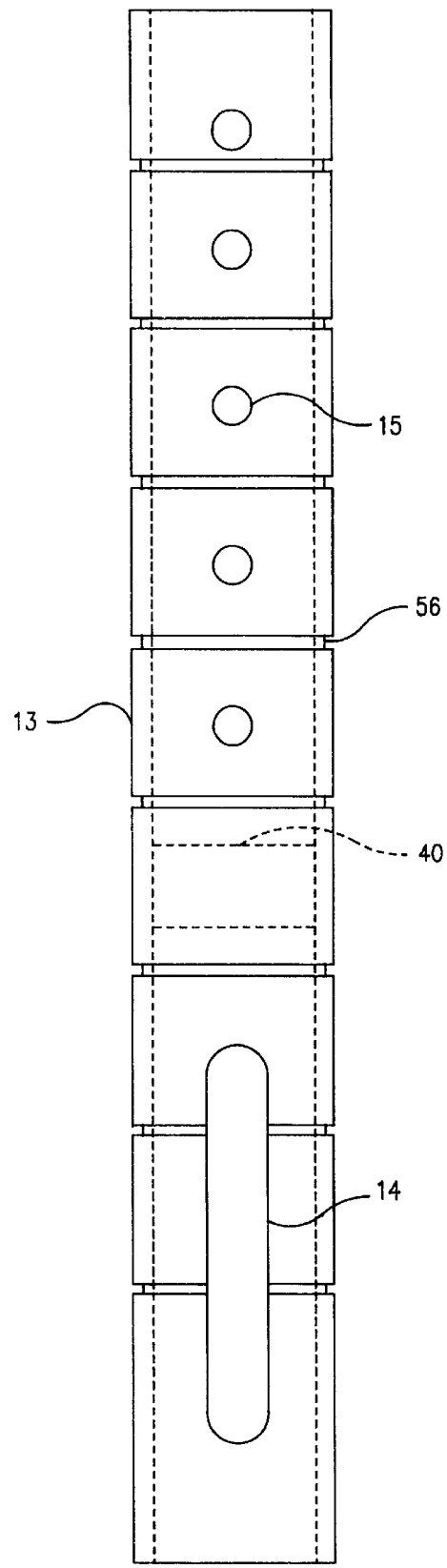
FIG. 6 illustrates a side view of an axially extending inner tube which alternately supports the different coalescer plates.

Now referring to the drawing there is shown a water-contaminate separator in accordance with this invention. FIG. 1 illustrates a partial cross sectional and schematic view which shows a separator including an upper end plate 11 and a bottom end plate 12. An outer tubular body 10 is held between the upper and lower plates by use of a plurality of equally spaced tie rods 21 which are provided with tightening nuts 36. The tubular body is provided with back-up ring seals 38 which prevent any leakage between the ends of the tubular body and the upper and lower end plates 11 and 12. An axially aligned tube 13 extends from the bottom plate to the upper plate and is confined by a cylindrical portion of the upper and lower plates and which surround an inlet opening 49 and an outlet opening 26 in the lower and upper plates. The tube 13, FIG. 6, is provided with spaced circular grooves 56 in which spaced coalescer plates 16 and 57 are alternately held in position within the tube 13. The coalescer plates 16 and 57 are provided with center holes which surround the tube 13 and which fit in the grooves 56. The grooves 56 are formed by equal length rings 28 that fit onto the tube. Each of the coalescer plates are formed in a conical shape and placed on the tube 13 with their apex end up. The coalescer plate 16 is provided with apertures 27 as shown in FIG. 2 and the conical shape is shown in FIG. 3. The coalescer plate 57 is shown in FIG. 4 and 5, and are not provided with apertures.

Each of the coalescer plates are spaced with their outer circumference about 0.250 inch from the inner diameter of the after tube 10. As shown in FIG. 6, the inner tube 13 is provided with an elongated port 14 which cross at least the bottom coalescer plates 16 and 57. The tube 13 has a plug 40 which closes the tube and the tube is provided with linearly spaced inlet apertures 15 above the blocking plug 40 through which the fluid above the blocking plug enters and is directed upwardly through the tube 13, through the outer port 26 and into the bottom outer area of a filter 25 which is secured to the top of the separator. The filter 25 is provided with an axial nipple 37 that connects with a pump 24. The pump 24 is then connected by a return line 34 with the tank 30.

Figure 7A:
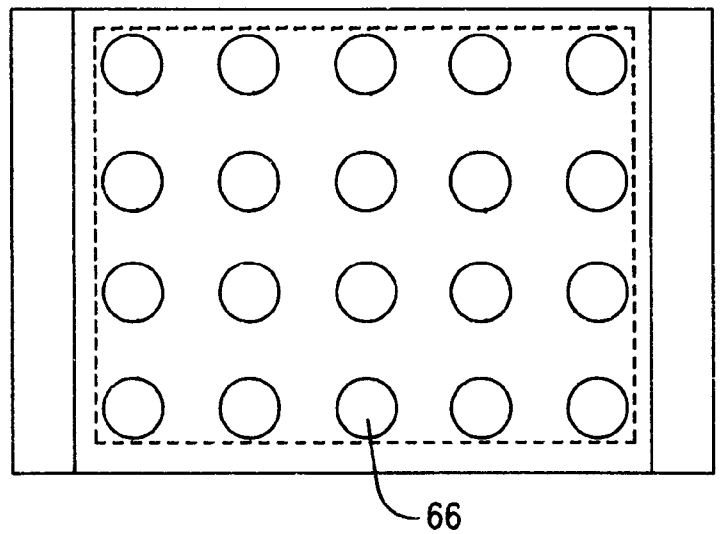
FIG. 7a is a bottom view of a fluid pickup nozzle through which the fluid is withdrawn from the bottom of the tank.
Figure 7B:
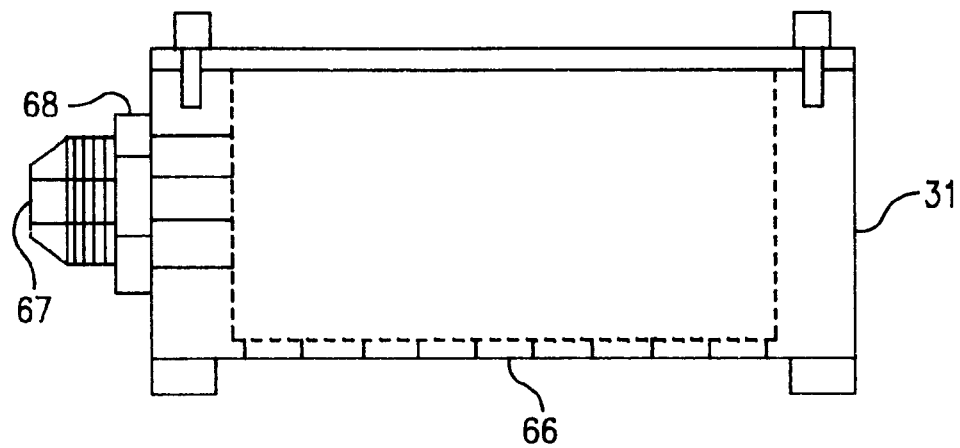
FIG. 7b is a side view of the fluid pickup nozzle.
Figure 8:
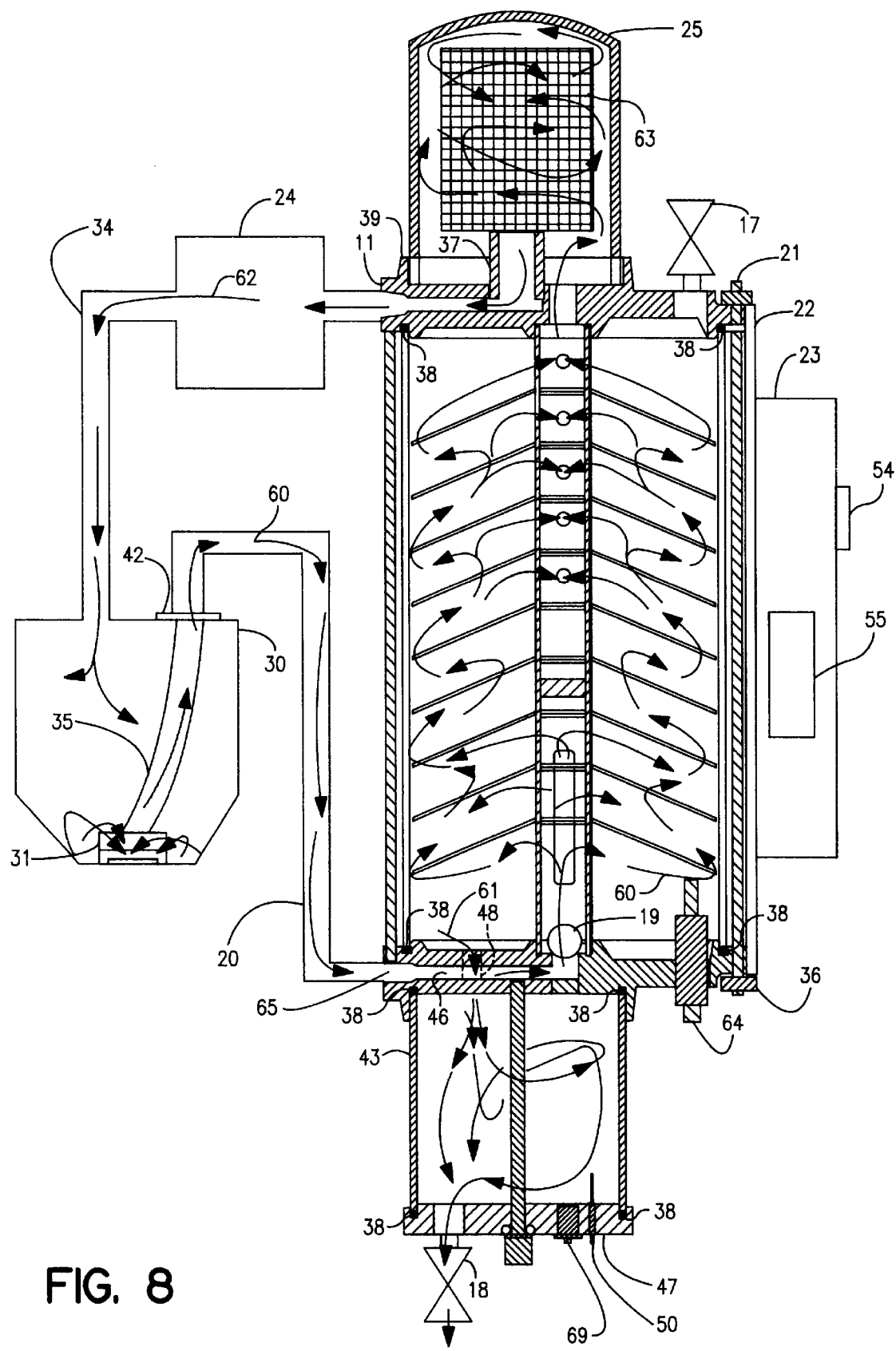
FIG. 8 is a schematic front view of the contaminate separator illustrating the fluid flow through the separator.

The bottom of the separator is provided with a sight glass tube 43 which is secured between a cap 47 and the bottom surface of the lower plate 12. The sight glass is provided with seals 38 and is held in place by a bolt 44. The lower plate 12 is provided with an inlet channel 46 which is connected to a fluid line 20 via inlet 65, which line 20 is connected to the fluid pickup nozzle 31 which extends to the bottom of the fuel tank 30. Within the fuel tank 30 there is disposed on the bottom wall a fuel pickup shown in FIGS. 7a and 7b. Fluid line 20 is connected to hose fitting 68 which is fastened to fluid pickup nozzle 31. Fluid drawn into openings 66 passes through opening 67 into line 20.

The separator is shown with an air inlet valve 17, at the top, a sensor 64 at the bottom, a control box for controlling the sensors, operation, etc. The bottom plate 12 is provided with a port 48 through which contaminates pass to the sight glass tube and the sight glass tube is provided with a drain port 51 and drain valve 18. The control box contains a switch 54, a timer 55 and any other controls necessary for operating the pump, etc. A valve 19 is provided at the inlet port of the tube 13 to prevent any back flow of the fuel or water.

The separator is designed to remove water and other impurities from storage tanks and containers used to store: diesel fuel, jet fuel, hydraulic oil, gasoline, kerosene, and other liquids with a specific gravity less than water (H2O).

In operation, the fluid is moved at a low velocity movement to allow the heavy matter to remain in the lower portion of the separator with a minimum of mixing. When the recirculating pump is turned on, a vacuum condition occurs in the separator chamber and liquid flows from the storage tank through the tubular line 20 at a velocity of less than one foot per second to minimize the turbulence and mixing of the fluids. The fluid then enters the bottom of the sight glass tube and the separator chamber through ports designed to reduce the velocity of the fluid to 0.09 feet per second. The water, having a specific gravity greater than fuel, will flow through the ports and remain in the bottom portion of the chamber. The fuel will flow upward above the water that has been separated. As the fuel flows upward, the fuel carries small particles of water that have been commingled with the fuel during the flow from the storage tank. These particles will attach themselves to the aluminum collector plates 16 and 57 and gradually increase in size until gravity pulls the droplets down the face of the plates to the tubular wall of the separator and then to the bottom of the separator chamber. As the fuel leaves the separator chamber it passes through a spin-on replaceable filter cartridge to remove any particles that may be in the fluid. The fluid enters the pump and is returned to the tank. The separated water can be drained from the chamber by opening an air inlet valve at the top of the chamber and then opening a drain valve at the bottom of the chamber.

When the system is activated, a timer or an optional water sensor located in the fuel tank will start the recirculating pump running for a preset time to pump fluid from the bottom of the storage tank through the separator chamber. A level control monitor will signal when the high water level is reached in the separator chamber and turn off the pump and illuminate a flashing light. After the separator is drained the system can be restarted. An optional low water sensor and second pump may be incorporated to automatically remove water from the separator.

EXAMPLE ONE

As an example, the fluid entering the vessel bottom port 65 may be 45 gallons per hour of aviation jet fuel A with 5% water. This fluid was drawn from the bottom of a storage tank with a temperature of 80 degrees F. The pressure at opening 53 is atmospheric. The vacuum at outlet opening 33 is 3.0 inches Hg. The jet fuel A leaving outlet opening 33 has a 0.001 percent water after 6.6 minutes of operation. This single pass through of the present separator is very efficient and typically a single pass through of the separator removes most all contaminates.

EXAMPLE TWO

In this example, the fluid entering the vessel bottom port 65 may be 40 gallons per hour of diesel fuel No.1, with 5% water. This fluid was drawn from the bottom of a storage tank with a temperature of 80 degrees F. The pressure at opening 53 is atmospheric. The vacuum at outlet opening 33 was 3.0 inches Hg. The diesel fuel No.1 leaving outlet opening 33 has 0.00055 percent water after 7.5 minutes of operation. This single pass through of the present separator typically removed all contaminant with one single pass of the fuel.

THE FOLLOWING ADVANTAGES RESULT FROM OPERATING THE SEPARATOR:

a. The system is independent of the engine fuel system.

b. The fuel enters the bottom of the separator to minimize turbulence and the mixing of contaminants.

c. The rectangular ports, collector plates, inner tube and fuel lines are designed to decrease velocity to minimize turbulence and the mixing of contaminants.

d. The system is designed to pull the fluid from the bottom of the storage tank (where water and other contaminants tend to settle; therefore, the separator eliminates a problem by drawing all fluid from the lowest part of the storage tank.

e. The level control monitor features an AC step voltage applied to the water sensor probe electrode. This allows a DC free and therefor electrolytic free measurement of the liquid resister. This system can be used aboard boats and ships without the fear of electrolysis occurring. This control will be substituted with an explosion proof unit when the separator is used in an explosive environment.

f. The separator is of a simple design and inexpensive to manufacture.

The foregoing relates to a preferred exemplary embodiment of the invention, it being understood that other variants and embodiments thereof are possible within the spirit and scope of the invention, the latter being defined by the appended claims.

I claim:

1. An apparatus for de-watering and purifying contaminated fuel oils and other fluids contained within a tank which comprises.

a tubular separator housing, said tubular separator housing including an inlet for contaminated fluids and an outlet, an axially aligned tube within said tubular separator housing, a plurality of spaced circular plates supported by said axially aligned tube and which extends to within a small spacing from an inside diameter of said housing, said axially aligned tube housing a plug therein to separate an upper portion from a lower portion, said upper portion in communication with said outlet and said lower portion in communication with said inlet, at least one aperture in said upper portion of said axially aligned tube, at least one aperture in said lower portion of said axially aligned tube, a feed line for feeding contaminated fluid to said inlet of said housing, a filter, said filter having an inlet connected with said outlet of said housing, and a return line secured between said filter and said tank for returning purified fluid back to said tank.

2. An apparatus as claimed in claim 1, in which said axially aligned tube has at least one elongated aperture in said bottom portion, and said axially aligned tube has more than one aperture in said upper portion.

3. An apparatus as set forth in claim 2, in which some of said spaced circular plates include a plurality of apertures therein.

4. An apparatus as set forth in claim 2, in which said contaminated fluid is directed into said axially aligned tube and out through said elongated aperture in the bottom portion, and water and contaminates pass through an outlet in a bottom plate of said housing and fuel having a specific gravity less than one is directed into said aperture in said upper portion of said tube and into said filter.

5. An apparatus as set forth in claim 4, in which said separator includes a sight glass tube secured to a bottom support of said housing in communication with said outlet in said bottom plate from which water is removed.

6. An apparatus as set forth in claim 5, in which said tubular housing includes an air inlet valve for admitting air into said housing, and said sight glass tube includes a water drain valve.

7. An apparatus as set forth in claim 1, in which some of said spaced circular plates include a plurality of apertures therein.

8. An apparatus as set forth in claim 1, which includes a pump for removing a contaminated fluid from said tank and for returning purified fluid to said tank.

9. An apparatus as set forth in claim 8, which includes a valve in said axially aligned tube to prevent a back-flow of contaminated fluid.

10. An apparatus as set forth in claim 8, in which said tubular housing includes an air inlet valve for admitting air into said housing.

\* \* \* \* \*